3,489,572
SWEETENING COMPOSITION
Paul Kracauer, New York, N.Y., assignor to Benjamin
Eisenstadt, Brooklyn, N.Y.
No Drawing. Filed Apr. 4, 1966, Ser. No. 540,141
Int. Cl. A23l 1/26
U.S. Cl. 99—141                                12 Claims

ABSTRACT OF THE DISCLOSURE

The invention relates to artificial sweetening compositions of a saccharine and/or a cyclamate plus a calcium or magnesium salt of glycerino phosphoric acid or of gluconic acid in specified proportions.

---

A certain amount of one or the mixture of two agents should be equivalent to a certain amount of sugar in sweetening power. Those ingredients are a saccharinate and a cyclamate. There have been several products—single or combination compounds marketed and/or patented which claim to be more acceptable, because they do not impart the objectionable bitter aftertaste. Those products are mainly offered in liquid form, in tablet form, or in granulated form.

The extenders for such products are water, or—for tablets—mixtures of carbonates and organic acids, or inert, suitable carriers as for instance lactose.

Many attempts have been made to overcome the well-known disadvantages regarding taste, especially by compounding such products (consisting of two ingredients) in most favorable proportions.

The object of my invention is to overcome the off-taste of any kind of sweetening composition—consisting of one or two agents (any combination) and usable for any form of sweetening composition such as liquid, tablet, or in granular form.

I found that the addition of *very* small amounts of a suitable organic calcium or magnesium salt to any sweetening composition overcomes, or even eliminates the off-taste.

The organic calcium or magnesium salt to be suitable must be edible, soluble, compatible, and completely inert regarding: taste, flavor, and odor.

The suitable salts are of glycerino phosphoric acid and of gluconic acid, namely calcium or magnesium glycerino phosphate and calcium or magnesium gluconate (food grades).

The required amounts to be added might differ to obtain the optimum effect, depending on the sweetening composition.

Generally: Sweetening agent plus between 20% to 60% of a calcium or magnesium salt of glycerino phosphoric acid or gluconic acid will be required.

In a liquid sweetening composition there should be 5 to 25% of a soluble saccharine and 2 to 7% of a calcium or magnesium salt of gluconic acid or 2 to 5% of a calcium or magnesium salt of glycerino phosphoric acid. Using a mixture of saccharine and cyclamate the proportions should be 8 to 15% of saccharine, 8 to 15% of cyclamate and 2 to 4% of a calcium or magnesium salt of gluconic acid or of glycerino phosphoric acid.

The granulated compositions comprise 0.8% to 2% of saccharine, 0.3% to 1% of a calcium or magnesium salt of gluconic acid (or 0.2% to 1% of a calcium or magnesium salt of glycerino phosphoric acid) and the balance of a suitable inert carrier, e.g. lactose. Using a mixture of saccharine and cyclamate the amounts should be 0.8 to 1.5% of saccharine, 0.8 to 15% of cyclamate, and 0.3 to 0.9% of the calcium magnesium salt of gluconic acid or 0.2 to 0.8% of the calcium or magnesium salt of glycerino phosphoric acid. The balance is a suitable carrier, e.g. lactose.

Sweetening tablets according to the present invention comprise about 7 to 15 mg. of saccharine and 5 to 10 mg. of a calcium of magnesium salt of gluconic acid, in an effervescent base consisting of a soluble carbonate and edible organic fruit acid, or 7 mg. to 15 mg. of saccharine plus 4 mg. to 8 mg. of a calcium or magnesium salt of glycerino phosphoric acid. Using a mixture of saccharine and cyclamate the proportions are 5 mg. to 10 mg. of saccharine, 70 mg. to 120 mg. of cyclamate and 4 mg. to 8 mg. of a calcium or magnesium salt of gluconic acid (or 3 mg. to 7 mg. of a calcium or magnesium salt of glycerino phosphoric acid), in an effervescent base consisting of a soluble carbonate and an edible fruit acid.

The following examples illustrate the invention; but it is understood that the invention is not to be limited by the examples.

(1) LIQUID SWEETENER

| | |
|---|---|
| Saccharinate | g__ 13 |
| Calcium gluconate | g__ 4 |
| Benzoic acid, U.S.P. | g__ 0.1 |
| Tegosept M (methyl p-hydroxybenzoate), a preservative | g__ 0.1 |
| Distilled water, qs. to 100 cc. | |

Dissolve in hot water (appr. 80° C.) the benzoic acid and Tegosept M. Add and dissolve the calcium gluconate. After cooling off add and dissolve the soluble saccharin. Filter and bottle.

In place of calcium gluconate in this example one may use 4 g. magnesium gluconate or 2.5 g. of magnesium or calcium glycerino phosphate.

Two drops are equivalent to about one teaspoon of sugar in sweetening power.

(2) LIQUID SWEETENER

| | |
|---|---|
| Saccharin sodium | g__ 12 |
| Cyclamate calcium | g__ 12 |
| Calcium gluconate | g__ 3 |
| Benzoic acid | g__ 0.1 |
| Tegosept M (methyl p-hydroxybenzoate), a preservative | g__ 0.1 |
| Distilled water, q.s. to 100 cc. | |

Dissolve in hot water (appr. 80° C.) the benzoic acid and Tegosept M. Add and dissolve the calcium gluconate. After cooling off add and dissolve the soluble saccharin and the cyclamate. Filter and bottle. In place of calcium gluconate in this example one may use magnesium gluconate or 2 mg. of magnesium or calcium glycerino phosphate.

Two drops are equivalent to about one teaspoon of sugar in sweetening power.

(3) GRANULATED SWEETENING COMPOSITION

| | G. |
|---|---|
| Soluble saccharin | 1.5 |
| Calcium gluconate | 0.7 |
| Lactose, U.S.P. | 97.9 |
| | 100.1 |

Blend thoroughly the above ingredients and sift. Pack, preferably, in envelopes 1 g. of the above mixture. This serving is equivalent to about 5 gms. of sugar in sweetening power.

In place of calcium gluconate one may also use the same amount of magnesium gluconate or also 0.5 g. of magnesium or calcium glycerino phosphate.

(4) GRANULATED SWEETENING COMPOSITION

| | G. |
|---|---|
| Saccharin sodium | 1.1 |
| Cyclamate calcium | 1.1 |
| Calcium gluconate | 0.5 |
| Lactose, U.S.P. | 97.3 |
| | 100 |

Blend the above ingredients thoroughly and sift.

In place of calcium gluconate one may also use the same amount of magnesium gluconate or calcium or magnesium glycerino phosphate.

One gram of the above mixture is equivalent to about 5 gms. of sugar in sweetening power.

(5) GRANULATED SWEETENING COMPOSITION

| | G. |
|---|---|
| Saccharin sodium | 1.1 |
| Cyclamate calcium | 15.0 |
| Calcium gluconate | 0.5 |
| Lactose, U.S.P. | 83.4 |
| | 100 |

Blend the above ingredients thoroughly and sift. In place of calcium gluconate one may also use the same amount of magnesium gluconate or calcium or magnesium glycerino phosphate.

One gram of the above mixture is equivalent to about two teaspoons of sugar in sweetening power.

(6) SWEETENING TABLETS (EFFERVESCENT)

| | G. |
|---|---|
| Saccharin sodium | 1.4 |
| Sodium bicarbonate | 14.6 |
| Tartaric acid | 12.0 |
| Calcium gluconate | 0.7 |
| Carbowax (6000) | 1.3 |
| | 30 |

Blend thoroughly saccharin with sodium bicarbonate. Incorporate one half of the Carbowax amount. Blend separately tartaric acid with calcium gluconate and the other half of the Carbowax amount. Blend thoroughly both portions.

If necessary (preferably) compress to large tablets, slug, granulate through Fitzmill. Compress at medium pressure. Two tablets weighing 0.15 g. each are equivalent to about one teaspoon of sugar in sweetening power (appr. 5 g.). In place of calcium gluconate one may also use the same amount of magnesium gluconate or calcium or magnesium glycerino phosphate.

(7) SWEETENING TABLETS (EFFERVESCENT)

| | G. |
|---|---|
| Saccharin calcium | 0.9 |
| Cyclamate calcium | 10.0 |
| Calcium gluconate | 0.6 |
| Fumaric acid | 12.0 |
| Sodium bicarbonate | 12.5 |
| Carbowax (6000) | 2.0 |
| | 38 |

Blend thoroughly saccharin soluble with the cyclamate. Incorporate sodium bicarbonate and one half of the amount of Carbowax.

Blend separately fumaric acid with the calcium gluconate and the other portion of Carbowax.

Blend well both mixtures, compress to large tablets, slug, and granulate through Fitzmill. Compress directly at medium pressure into tablets of 0.19 g. each.

Each tablet contains 4.5 mg. saccharin soluble and 50 mg. of calcium cyclamate. Each tablet is equivalent to about 4 g. of sugar in sweetening power. One may use in place of calcium gluconate also the same amount of magnesium gluconate or calcium or magnesium glycerino phosphate.

I claim:

1. A liquid sweetening composition comprising between 5 to 25% of a soluble saccharin and 2% to 7% of an edible calcium or magnesium salt of gluconic acid.

2. A liquid sweetening composition comprising between 5% to 25% of a soluble saccharin and 2% to 5% of an edible calcium or magnesium salt of the glycerino phosphoric acid.

3. A liquid sweetening composition comprising between 8% to 15% of a soluble saccharin, 8% to 15% of a cyclamate, 2% to 4% of an edible calcium or magnesium salt of gluconic acid.

4. A liquid sweetening composition containing between 8% to 15% of an edible saccharin, 8% to 15% of a cyclamate, 2% to 4% of an edible calcium or magnesium salt of glycerino phosphoric acid.

5. A granulated sweetening composition comprising between 0.8% to 2% soluble saccharin, 0.3% to 1% of an edible calcium or magnesium salt of gluconic acid, 97% to 98.1% of lactose as inert extender, and carrier.

6. A granulated sweetening composition comprising between 0.8% to 2% soluble saccharin, 0.2 to 1% of an edible calcium or magnesium salt of glycerino phosphoric acid the balance lactose 97% to 98.1% of lactose as suitable extender, and carrier.

7. A granulated sweetening composition comprising between 0.8% to 1.5% of soluble saccharin, 0.8% to 15% of a cyclamate, 0.3% to 0.9% of an edible calcium or magnesium salt of gluconic acid, 82.6% to 98.1% of lactose as suitable extender, and carrier.

8. A granulated sweetening composition comprising between 0.8% to 1.5% of soluble saccharin, 0.8% to 15% of a cyclamate, 0.2% to 0.8% of an edible calcium or magnesium salt of glycerino phosphoric acid, 82.5% to 98.2% of lactose as carrier, and extender.

9. A sweetening tablet comprising between 7 to 15 mg. of soluble saccharin, 5 mg. to 10 mg. of an edible calcauim or magnesium salt of gluconic acid in an effervescent base consisting of a soluble carbonate and edible organic fruit acid.

10. A sweetening tablet comprising between 7 mg. to 15 mg. of a soluble saacharin, 4 mg. to 8 mg. of an edible calcium or magnesium salt of glycerino phosphoric acid in an effervescent base consisting of a soluble carbonate and an edible fruit acid.

11. A sweetening tablet comprising between 5 mg. to 10 mg. of soluble saccharin, 70 mg. to 120 mg. of a cyclamate, 4 mg. to 8 mg. of an edible calcium or magnesium salt of gluconic acid in an effervescent base consisting of a soluble carbonate and an edible fruit acid.

12. A sweetening tablet comprising between 5 mg. to 10 mg. of a soluble saccharin, 70 mg. to 120 mg. of a cyclamate, 3 mg. to 7 mg. of an edible calcium or magnesium salt of glycerino phosphoric acid in an effervescent base consisting of a soluble carbonate and edible fruit acid.

References Cited

UNITED STATES PATENTS

| 2,968,566 | 1/1961 | Munch | 99—143 |
| 3,173,797 | 3/1965 | Lowey. | |
| 3,259,506 | 7/1966 | Eisenstadt. | |

RAYMOND N. JONES, Primary Examiner